(12) United States Patent
Vandal et al.

(10) Patent No.: US 10,556,821 B2
(45) Date of Patent: Feb. 11, 2020

(54) LAMINATED WINDOW INCLUDING DIFFERENT GLASS SUBSTRATES WITH LOW-E COATING ADJACENT VEHICLE OR BUILDING INTERIOR AND/OR METHODS OF MAKING THE SAME

(71) Applicant: GUARDIAN GLASS, LLC, Auburn Hills, MI (US)

(72) Inventors: Robert A. Vandal, Syracuse, IN (US); Jim St. Jean, Canton, MI (US)

(73) Assignee: GUARDIAN GLASS, LLC, Auburn Hills, MI (US)

( * ) Notice: Subject to any disclaimer, the term of this patent is extended or adjusted under 35 U.S.C. 154(b) by 94 days.

(21) Appl. No.: 15/497,235

(22) Filed: Apr. 26, 2017

(65) Prior Publication Data

US 2018/0312428 A1    Nov. 1, 2018

(51) Int. Cl.
| | | |
|---|---|---|
| *C03C 17/34* | (2006.01) | |
| *B32B 17/10* | (2006.01) | |
| *C03C 3/087* | (2006.01) | |
| *C03C 4/02* | (2006.01) | |
| *C03C 4/08* | (2006.01) | |
| *E06B 3/66* | (2006.01) | |
| *B60J 3/00* | (2006.01) | |
| *B32B 7/023* | (2019.01) | |

(52) U.S. Cl.
CPC .......... *C03C 17/3435* (2013.01); *B32B 7/023* (2019.01); *B32B 17/10036* (2013.01); *B32B 17/10201* (2013.01); *B32B 17/10761* (2013.01); *B60J 3/007* (2013.01); *C03C 3/087* (2013.01); *C03C 4/02* (2013.01); *C03C 4/082* (2013.01); *E06B 3/6608* (2013.01); *B32B 2250/03* (2013.01); *B32B 2255/20* (2013.01); *B32B 2307/4026* (2013.01); *B32B 2307/412* (2013.01); *B32B 2605/00* (2013.01); *C03C 2204/00* (2013.01); *C03C 2217/281* (2013.01); *C03C 2217/948* (2013.01)

(58) Field of Classification Search
CPC ..... B32B 17/00–17/1099; C03C 17/00–17/44; C03C 4/082; C03C 4/08; C03C 4/02
See application file for complete search history.

(56) References Cited

U.S. PATENT DOCUMENTS

| | | |
|---|---|---|
| 5,030,594 A | 7/1991 | Heithoff |
| 5,214,008 A | 5/1993 | Beckwith et al. |
| 5,344,718 A | 9/1994 | Hartig et al. |
| 5,656,559 A | 8/1997 | Combes et al. |

(Continued)

FOREIGN PATENT DOCUMENTS

| | | | |
|---|---|---|---|
| EP | 0864545 A1 * | 9/1998 | ....... B32B 17/10036 |
| WO | WO 2012/078395 | 6/2012 | |
| WO | WO 2016/202799 | 12/2016 | |

*Primary Examiner* — Prashant J Khatri (57) ABSTRACT

A laminated vehicle window has different glass substrates and a low-emissivity (low-E) coating on an interior surface thereof, so that the low-E coating is to be located adjacent and exposed to the vehicle interior. In certain example embodiments, the low-E coating includes a transparent conductive oxide (TCO) layer of a material such as indium-tin-oxide (ITO). In certain example embodiments, the exterior glass substrate contains more iron, and is thus more absorbing of IR radiation, than the interior glass substrate.

33 Claims, 4 Drawing Sheets

(56) References Cited

U.S. PATENT DOCUMENTS

| | | | |
|---|---|---|---|
| 5,932,502 A | 8/1999 | Longobardo et al. | |
| 6,218,323 B1 | 4/2001 | Bretschneider et al. | |
| 6,506,487 B2 | 1/2003 | Nagai | |
| 6,576,349 B2 | 6/2003 | Lingle et al. | |
| 7,037,869 B2 | 5/2006 | Landa et al. | |
| 7,144,837 B2 | 12/2006 | Landa et al. | |
| 7,151,065 B2 | 12/2006 | Thomsen et al. | |
| 7,169,722 B2 | 1/2007 | Landa et al. | |
| 9,199,875 B2 | 12/2015 | Lemmer et al. | |
| 9,266,773 B2 | 2/2016 | Lemmer et al. | |
| 9,469,767 B2 | 10/2016 | Lemmer et al. | |
| 2004/0121896 A1* | 6/2004 | Landa ................ | C03C 3/087 501/71 |
| 2008/0070045 A1* | 3/2008 | Barton ............... | B32B 17/10036 428/433 |
| 2011/0212311 A1* | 9/2011 | Lemmer ............. | C03C 17/3417 428/212 |
| 2011/0217535 A1 | 9/2011 | Barton et al. | |
| 2012/0021149 A1 | 1/2012 | Myli et al. | |
| 2014/0370209 A1 | 12/2014 | Walp | |
| 2016/0002100 A1* | 1/2016 | Melcher ............. | C03C 17/3435 428/216 |

* cited by examiner

LAMINATED WINDOW INCLUDING DIFFERENT GLASS SUBSTRATES WITH LOW-E COATING ADJACENT VEHICLE OR BUILDING INTERIOR AND/OR METHODS OF MAKING THE SAME

FIELD OF THE INVENTION

Certain example embodiments of this invention relate to a laminated window, which may have different glass substrates. A low-emissivity (low-E) coating is provided on an interior surface of the window, so that the low-E coating is to be located adjacent and exposed to the interior of a vehicle, building, or the like. In certain example embodiments, exterior/outboard and interior/inboard glass substrates of the window are laminated to each other. The low-E coating, including a transparent conductive oxide (TCO) layer of a material such as indium-tin-oxide (ITO), is provided on the surface of the interior glass substrate so as to face and be exposed to the vehicle/building interior. In certain example embodiments, the exterior glass substrate contains more iron, and is thus more absorbing of IR radiation, than the interior glass substrate. In certain example embodiments, the low-E coating may be of or include a TCO layer such as ITO located between first and second dielectric layers which may be of or include silicon oxynitride, silicon nitride, and/or the like. The coating is sufficiently durable to survive in exposed environments, and also has a sufficiently low hemispherical emissivity such that the window can retain heat from the vehicle/building interior, thereby improving solar heat gain characteristics and/or reducing the likelihood of condensation thereon.

BACKGROUND AND SUMMARY OF EXAMPLE EMBODIMENTS OF THE INVENTION

Vehicle, transportation and marine glazing systems for many years have sought to reduce solar heat load through the glazing while maintaining a desired level of visible transmission. The primary drivers for this are occupant comfort, reduced air conditioning load, improved fuel economy and reduced emissions.

Solutions often employ tinted glass to reduce visible light transmission and mitigate solar heat gain in vehicle cabins. Such solutions are often referred to as absorbing solutions as they absorb a portion of the solar spectrum, with this energy being converted into direct heating of the glass/window assembly. Absorbing glass solutions are used in both laminated and monolithic applications, with all glass substrates being tinted in laminated applications. Such solutions have the advantages of reducing direct solar transmitted energy while improving comfort. However, a primary disadvantage of absorbing solutions is that the heat gained by the assembly is subsequently rejected or re-radiated in all directions, and therefore a portion of the heat is transferred to the interior space of the vehicle or the like thereby becoming a secondary source of undesired heat. This effect of secondary heat is recognized and quantified by many standards of calculation of solar load through glazing such as NFRC solar heat gain coefficient (SHGC), or Tts (Total Solar Transmission) per ISO 13837. SF (G-Factor; EN410-673 2011) and SHGC (NFRC-2001) values are calculated from the full spectrum and may be measured with a spectrophotometer such as a Perkin Elmer 1050. In each case, these values represent the sum of the direct solar transmission and secondary re-radiated heat components. For example, most tinted/absorbing glass solutions having a visible transmission ($T_{vis}$) over 70% typically exhibit a Tts or SHGC in the range of 53-65%, compared with clear glass having a Tts or SHGC of about 80%. In the case of lower $T_{vis}$ absorbing solutions the Tts can be lower. For example, a $T_{vis}$ in the range of 15-20% can yield a Tts or SHGC around 40%.

Silver based low-E coatings have also been used in vehicle windshields to improve solar heat rejection. Such silver based low-E coatings are typically provided between the glass substrates of a laminated windshield. The advantage of silver based low-E coatings is the fact that a significant portion of the solar energy is reflected by the window, rather than absorbed, hence mitigating a large portion of secondary heating. Thus, such reflecting solutions typically have about 8-15% lower Tts than a comparable $T_{vis}$ absorbing solution. The disadvantage of these silver based low-E reflecting solutions is primarily related to their cost and complexity of manufacture at the fabrication level. Silver based low-E coatings are typically soft and easily damaged in processing as well as being susceptible to damage from the heating processes use to strengthen or shape the glass. In addition, such reflective solutions also tend to significantly increase visible reflection from one or both sides of the window creating additional potential interior glare and undesirable outward color effects. The exterior appearance of such solutions is often very notably different from that of regular glazings and in most cases is perceived negatively.

In certain example embodiments of this invention, it has been found that applying a low-E coating having a TCO such as ITO, which is surface durable, to the inside surface of a solar absorbing assembly provides for an improvement in the solar heat gain of the assembly. An ITO based coating with an emissivity of around 0.17-0.22 for example can result in a reduction of SHGC or Tts of at least about 0.05 (5%), more preferably of at least about 0.10 (10%), absolute, compared to if no such coating is provided. Further, in the case of a laminate window, it has been surprisingly found that using a hybrid including an absorbing tinted glass (e.g., relatively high iron glass) for the outboard glass substrate and a different low absorption clear glass (e.g., relatively low iron glass) for the inboard glass substrate, with the ITO-based low-E coating on the surface of the inboard glass substrate to face the vehicle interior, is advantageous in that solar heat gain performance can be further improved compared to when the same glass is used for both substrates along with the same coating.

Thus, certain example embodiments of this invention relate to a laminated window (e.g., vehicle window, marine vehicle, or building window) having different glass substrates and an ITO-based low-emissivity (low-E) coating on an interior surface thereof, so that the ITO-based low-E coating is to be located adjacent and exposed to the vehicle interior or building interior. In certain example embodiments, exterior/outboard and interior/inboard glass substrates of the window are laminated to each other via a laminating material such as polyvinyl butyral (PVB), ethylene-vinyl acetate (EVA), or the like. No low-E coating is provided between the glass substrates in certain example embodiments. Instead, the low-E coating, including a transparent conductive oxide (TCO) layer of a material such as indium-tin-oxide (ITO), is provide on the surface of the interior glass substrate so as to face and be exposed to the vehicle interior or building interior. In certain example embodiments of this invention, the exterior glass substrate contains more iron, and is thus more absorbing of IR radiation, than the interior glass substrate. It has surprisingly been found that this hybrid approach including an absorbing relatively high iron glass substrate on the outboard side, and a clear relatively low iron glass substrate on the inboard side, with the low-E coating on the clear inboard glass substrate facing the vehicle interior or building interior, results in a laminated window having improved solar heat gain performance compared to using the same glass for both the inboard and outboard glass substrates. In certain example embodiments, the low-E coating may be of or include a TCO layer such as ITO located between first and second dielectric layers which may be of or include silicon oxynitride, silicon nitride, and/or the like. The coating is sufficiently durable to survive in exposed environments, and also has a sufficiently low hemispherical emissivity such that the window can retain heat from the vehicle/building interior, thereby improving solar heat gain characteristics and/or reducing the likelihood of condensation thereon.

In certain example embodiments, the ITO-based coating on at least one glass substrate is heat treated (e.g., at a temperature of at least 580 degrees C. for at least about 2 minutes, more preferably at least about 5 minutes), and may be thermally tempered and/or heat bent in this respect. The heat treatment, for example, may be used to activate the ITO-based coating and reduce its sheet resistance and emittance, and/or may be used for thermal tempering and/or heat bending of the glass of the window. In certain example embodiments of this invention, following such heat treatment (HT), the ITO-based coating may have a hemispherical emissivity of no greater than 0.40 (more preferably no greater than 0.30, and most preferably no greater than 0.25) and/or a sheet resistance ($R_s$) of no greater than 30 ohms/square (more preferably no greater than 25 ohms/square, and most preferably no greater than 20 ohms/square).

In an example embodiment of this invention, there is provided a vehicle (e.g., car, truck, train, bus, or boat) window comprising: first and second glass substrates laminated to each other via a polymer inclusive interlayer, wherein the first glass substrate is configured to be located closer to a vehicle interior than is the second glass substrate; a multi-layer coating on the first glass substrate and configured to be located adjacent and exposed to a vehicle interior, so that the coating is not located between the first and second glass substrates, wherein the coating has a sheet resistance ($R_s$) of no greater than 32 ohms/square and comprises a transparent conductive layer comprising indium-tin-oxide (ITO) located between and directly contacting first and second transparent dielectric layers, and wherein the first transparent dielectric layer is located between at least the first glass substrate and the transparent conductive layer comprising ITO; wherein a base glass composition of each of the first and second glass substrates comprises (wt. %) $SiO_2$ 67-75%, $Na_2O$ 10-20%, CaO 5-15%, MgO 0-5%, $Al_2O_3$ 0-5%, $K_2O$ 0-5%; wherein the second glass substrate contains at least 0.25% more total iron (expressed as $Fe_2O_3$) than does the first glass substrate.

In another example embodiment of this invention, there is provided a window comprising: first and second glass substrates laminated to each other via a polymer inclusive interlayer, wherein the first glass substrate is configured to be located closer to a vehicle interior or building interior than is the second glass substrate; a multi-layer coating on the first glass substrate and configured to be located adjacent and exposed to a vehicle interior or building interior, so that the coating is not located between the first and second glass substrates, wherein the coating comprises a transparent conductive layer comprising indium-tin-oxide (ITO) located between and directly contacting first and second transparent dielectric layers, and wherein the first transparent dielectric layer is located between at least the first glass substrate and the transparent conductive layer comprising ITO; wherein a base glass composition of each of the first and second glass substrates comprises:

| Ingredient | Wt. % |
|---|---|
| $SiO_2$ | 67-75% |
| $Na_2O$ | 10-20% |
| CaO | 5-15% |
| MgO | 0-5% |
| $Al_2O_3$ | 0-5% |
| $K_2O$ | 0-5%; | wherein no low-E coating is provided between the first and second glass substrates; wherein the first and second dielectric layers are silicon based and comprise at least one of oxygen and nitrogen; wherein the coating comprises, moving away from the first glass substrate: the first dielectric layer, the first dielectric layer having an index of refraction of 1.60-1.90 and a thickness of from 10-120 nm, the layer comprising ITO, the layer comprising ITO having a thickness of from 75-175 nm, and the second dielectric layer, the second dielectric layer having an index of refraction of 1.60-1.90 and a thickness of from 10-120 nm; wherein the coating has a sheet resistance ($R_s$) of no greater than 25 ohms/square and a hemispherical emissivity of no greater than 0.30; and wherein the window has an SHGC value of no greater than 0.48.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Referring now more particularly to the accompanying drawings in which like reference numerals indicate like parts in the several views.

Certain example embodiments of this invention relate to a laminated window (e.g., vehicle window such as a vehicle windshield, marine vehicle window such as on a boat, or building window) having different glass substrates 1 and 2, and an ITO-based low-emissivity (low-E) coating 20 on an interior surface thereof, so that the ITO-based low-E coating 20 is to be located adjacent and exposed to the vehicle or building interior ("vehicle interior" is shown in FIGS. 1-4 for purposes of example). In certain example embodiments, exterior/outboard glass substrate 2 and interior/inboard glass substrate 1 of the window are laminated to each other via a polymer inclusive interlayer laminating material 3 such as polyvinyl butyral (PVB), ethylene-vinyl acetate (EVA), or the like. No low-E coating is provided between the glass substrates 1 and 2 in certain example embodiments. Instead, the low-E coating 20, including a transparent conductive oxide (TCO) layer of a material such as indium-tin-oxide (ITO) 5, is provide on the surface of the interior glass substrate 1 so as to face and be exposed to the vehicle interior or building interior. In certain example embodiments of this invention, the exterior glass substrate 2 contains more iron, and is thus more absorbing of IR radiation, than the interior glass substrate 1. Iron is an absorbing material in the glass, and the more iron present the more absorbing the glass. It has surprisingly been found that this hybrid approach including an absorbing relatively high iron glass substrate 2 on the outboard side, and a clear relatively low iron glass substrate 1 on the inboard side, with the low-E coating 20 on the clear inboard glass substrate 1 facing the vehicle interior or building interior, results in a laminated window having improved solar heat gain performance compared to using the same glass for both the inboard and outboard glass substrates. In certain example embodiments, the low-E coating 20 may be of or include a TCO layer such as ITO 5 located between first and second dielectric layers 9a and 9b which may be of or include silicon oxynitride, silicon nitride, and/or the like. The coating 20 is sufficiently durable to survive in exposed environments, and also has a sufficiently low hemispherical emissivity such that the window can retain heat from the vehicle/building interior, thereby improving solar heat gain characteristics and/or reducing the likelihood of condensation thereon.

The total amount of iron present in glass substrates 1 and 2 is expressed herein in terms of $Fe_2O_3$ in accordance with standard practice. However, typically, not all iron in the glass is in the form of $Fe_2O_3$. Instead, iron is usually present in both the ferrous state ($Fe^{2+}$; expressed herein as FeO, even though all ferrous state iron in the glass may not be in the form of FeO) and the ferric state ($Fe^{3+}$). Iron in the ferrous state ($Fe^{2+}$; FeO) is a blue-green colorant, while iron in the ferric state ($Fe^{3+}$) is a yellow-green colorant. The blue-green colorant of ferrous iron ($Fe^{2+}$; FeO) is a strong colorant and introduces significant color into the glass. While iron in the ferric state ($Fe^{3+}$) is also a colorant, iron in the ferric state tends to be weaker as a colorant than its ferrous state counterpart.

Glass substrates 1 and 2, in FIGS. 1-4, preferably utilize soda-lime-silica glass, made via the float process, as their base composition/glass. In addition to base composition/glass, a colorant portion is provided. An exemplary soda-lime-silica base glass for each of glass substrates 1 and 2 according to certain embodiments of this invention, on a weight percentage basis, includes the following basic ingredients:

TABLE 1

EXAMPLE BASE GLASS

| Ingredient | Wt. % |
|---|---|
| $SiO_2$ | 67-75% |
| $Na_2O$ | 10-20% |
| CaO | 5-15% |
| MgO | 0-5% |
| $Al_2O_3$ | 0-5% |
| $K_2O$ | 0-5% |
| BaO | 0-1% |

Other minor ingredients, including various conventional refining aids, such as $SO_3$, carbon, and the like may also be included in the base glass. In certain embodiments, for example, glass herein may be made from batch raw materials silica sand, soda ash, dolomite, limestone, with the use of salt cake ($SO_3$) and/or Epsom salts (e.g., about a 1:1 combination of both) as refining agents. Preferably, soda-lime-silica based glasses herein include by weight from about 10-15% $Na_2O$ and from about 6-12% CaO.

In addition to the base glass, the glass composition of each of the glass substrates 1 and 2 includes a colorant portion including iron which has a bearing on the coloration and absorption of the respective glass substrates 1 and 2. As explained above, the exterior glass substrate 2 contains more iron, and is thus more absorbing of radiation, than the interior glass substrate 1. Iron is an absorbing material in the glass, and the more iron present the more absorbing the glass. In certain example embodiments of this invention, interior/inboard glass substrate 1 is a substantially clear glass made of relatively low iron glass and contains from 0.001-0.20% total iron, more preferably from 0.001-0.15% total iron, more preferably from 0.005-0.12% total iron, and most preferably from 0.01-0.10% total iron (expressed as $Fe_2O_3$), in order to be a low absorption glass. Note that the glass composition % amounts herein are expressed in terms of weight percentage (%) of the total glass composition. In contrast, exterior/outboard glass substrate 2 is a colored and/or tinted glass made of relatively high iron glass and contains at least 0.30% total iron, more preferably at least 0.50% total iron, still more preferably at least 0.60% total iron, more preferably at least 0.70% total iron, and most preferably at least 0.75% total iron (expressed as $Fe_2O_3$), in order to be a high absorption glass. In preferred embodiments of this invention, outboard glass substrate 2 contains at least 0.25% (more preferably at least 0.40%, still more preferably at least 0.50%, and most preferably at least 0.60%) more total iron than does inboard glass substrate 1. In certain example embodiments of this invention, inboard glass substrate 1 has a visible transmission ($T_{vis}$) at least about 10% higher (more preferably at least 15% higher, and most preferably at least 20% higher, Illuminant A, 2 degree Observer standard) than the visible transmission of the outboard glass substrate 2, at a reference thickness of 4 mm or 6 mm.

For example, in an example embodiment of this invention, outboard glass substrate 2 may be a green colored glass substrate, such as SMGII or SMGIII available from Guardian Industries Corp. having visible transmission of about 60-68% Illuminant A 2 degree Observer at a reference thickness of 6 mm, containing about 0.70-0.95% total iron, and inboard glass substrate 1 may be a clear low iron glass substrate available from Guardian Industries Corp. having visible transmission of about 80-91% Illuminant A 2 degree Observer at a reference thickness of 6 mm and containing from about 0.01-0.10% total iron. In another example embodiment of this invention, outboard glass substrate 2 may be a dark tinted glass substrate, such as PrivaGuard available from Guardian Industries Corp. having visible transmission of about 5-12% Illuminant A 2 degree Observer at a reference thickness of 6 mm, containing about 1.4-1.7% total iron, and inboard glass substrate 1 may be a clear glass substrate available from Guardian Industries Corp. having visible transmission of about 80-91% Illuminant A 2 degree Observer at a reference thickness of 6 mm and containing from about 0.01-0.10% total iron. These examples apply to any of the embodiments shown in FIGS. 1-4.

For example, the clear low iron inboard glass substrate 1 may be made of any of the low iron glass compositions described in any of U.S. Pat. Nos. 7,169,722, 7,144,837, 6,218,323, 5,030,594, 5,656,559, or 7,037,869, the disclosures of which are hereby incorporated herein by reference; and the relatively higher iron outboard glass substrate 2 may be made of any of the relatively higher iron glass compositions described in any of U.S. Pat. Nos. 5,214,008, 4,792,536, 5,393,593, or 5,932,502, the disclosures of which are hereby incorporated herein by reference.

In certain example embodiments of this invention, the low iron inboard glass substrate 1 may have a colorant portion as set forth in the table below (in terms of weight percentage of the total glass composition). Note that the material listed in Table 2 below are in addition to the base glass described above.

TABLE 2

Example Colorant Portion for Low Iron Inboard Glass Substrate 1

| Ingredient | General (wt. %) | More Preferred | Most Preferred |
|---|---|---|---|
| total iron (expressed as $Fe_2O_3$): | 0.001-0.20% | 0.001-0.15% | 0.005-0.12% |
| erbium oxide (e.g., $Er_2O_3$): | 0-0.10% | 0.00001-0.10% | 0.0001-0.01% |
| selenium (Se): | 0-0.10% | 0-0.05% | 0-0.01% |
| cobalt oxide (e.g., $Co_3O_4$): | 0-0.10% | 0.00001-0.10% | 0.0001-0.001% |
| cerium oxide (e.g., $CeO_2$): | 0-0.30% | 0-0.20% | 0-0.12% |

In certain example embodiments of this invention, the higher iron outboard glass substrate 2 may have a colorant portion as set forth in the table below (in terms of weight percentage of the total glass composition). Note that the material listed in Table 3 below are in addition to the base glass described above.

TABLE 3

Example Colorant Portion for Higher-Fe Outboard Glass Substrate 2

| Ingredient | General (wt. %) | More Preferred | Most Preferred |
|---|---|---|---|
| total iron (expressed as $Fe_2O_3$): | ≥0.30% | ≥0.50% | ≥0.60% (or ≥0.75%) |
| erbium oxide (e.g., $Er_2O_3$): | 0-0.10% | 0-0.05% | 0-0.01% |
| selenium (Se): | 0-0.10% | 0-0.05% | 0-0.01% |
| cobalt oxide (e.g., $Co_3O_4$): | 0-0.10% | 0.00001-0.05% | 0.0001-0.03% |
| cerium oxide (e.g., $CeO_2$): | 0-0.30% | 0-0.20% | 0-0.12% |

Other colorants may or may not be provided in the glass substrates 1 and 2.

It is noted that glass according to certain example embodiments of this invention is often made via the known float process in which a tin bath is utilized. It will thus be appreciated by those skilled in the art that as a result of forming the glass on molten tin in certain exemplary embodiments, small amounts of tin or tin oxide may migrate into surface areas of the glass on the side that was in contact with the tin bath during manufacture (i.e., typically, float glass may have a tin oxide concentration of 0.05% or more (wt.) in the first few microns below the surface that was in contact with the tin bath).

In certain example embodiments, the ITO-based coating 20 on at least substrate 1 is heat treated (e.g., at a temperature of at least 580 degrees C. for at least about 2 minutes, more preferably at least about 5 minutes), and may be thermally tempered and/or heat bent in this respect. The heat treatment, for example, may be used to activate the ITO-based coating and reduce its sheet resistance and emittance, and/or may be used for thermal tempering and/or heat bending of the glass of the window such as in an autoclave. In certain example embodiments of this invention, following such heat treatment (HT), the ITO-based coating 20 may have a hemispherical emissivity of no greater than 0.40 (more preferably no greater than 0.30, more preferably no greater than 0.25, and most preferably no greater than 0.20) and/or a sheet resistance ($R_s$) of no greater than 32 ohms/square (more preferably no greater than 30 ohms/square, even more preferably no greater than 25 ohms/square, and most preferably no greater than 20 ohms/square). Laminated windows combine low sheet resistance and/or low emissivity, with desirable visible transmission. In certain example embodiments of this invention, the visible transmission ($T_{vis}$) of the window is at least about 50%, more preferably at least about 60%, still more preferably at least about 70%. Moreover, in certain example embodiments of this invention, the window has an exterior visible reflectance of no greater than 10% (more preferably no greater than 9%), and an interior visible reflectance of no greater than 10% (more preferably no greater than 9%). In certain example embodiments of this invention, the window has an SHGC value of no greater than 0.75 (75%), more preferably no greater than 0.50 (50%), even more preferably no greater than 0.48 (48%), and sometimes no greater than 0.30 (30%) or 0.27 (27%).

Providing the low-E coating 20 to the interior of non or low-absorbing glass 1 have an impact on solar heat gain of the system, but this can be significantly improved by combining coating 20 with selective placement of absorbing glass substrates 1 and 2. The provision of coating 20 in the position shown in FIGS. 1-4 have at least the following advantages in the final assembly: minimal or reduced influence on color of the system meaning they appear the same as the uncoated part to the naked eye; no significant increase in visible reflectance from either side of the window and possibly a small decrease is noted creating advantage regarding interior veiling glare in certain example embodiments. Durable hard coat 20 essentially has similar handling and processing durability as bare glass. Adding coating 20 to a typical clear laminate, where both glass substrates are clear and non or low-absorbing, will reduce SHGC about 6-7% absolute. If an absorbing tint glass is used instead of clear the improvement over the same tinted substrate without coating is more in the range of 7-10%. However, if the coating 20 is employed in on a hybrid laminate having a tinted absorbing outer glass substrate 2 with low absorption inward glass substrate 1 then the SHGC is advantageously affected/reduced by about 1-2% absolute depending on the overall $T_{vis}$ of the system. The greater the ratio of solar absorption between the glass substrates (the outer glass substrate 2 being more absorbing of radiation), the greater the SHGC benefit it has surprisingly been found. While designed to enhance U value through reflection of IR energy back toward the interior space of the vehicle or building, similarly this emissivity selectively reduces the secondary heat transfer to the inner surface altering the typical energy balance seen without the coating 20.

Figure 1:
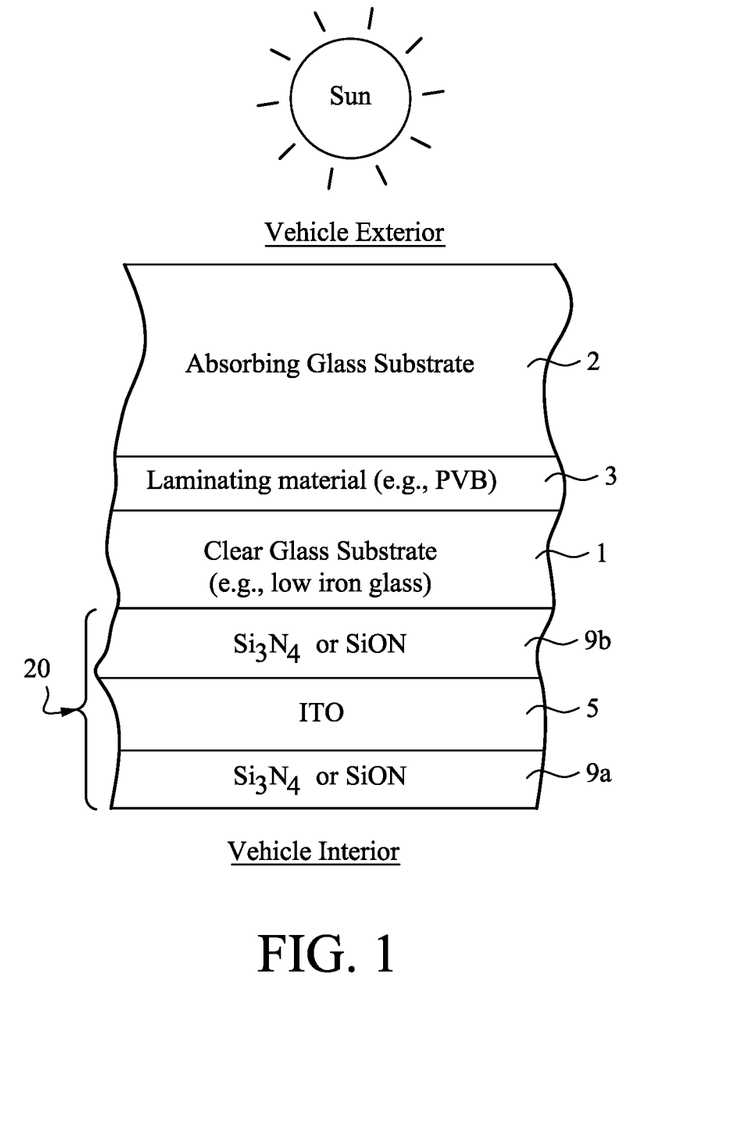
FIG. 1 is a cross sectional view of a laminated window according to an example embodiment of this invention.

FIG. 1 is a cross sectional view of a laminated window according to an example embodiment of this invention. The FIG. 1 example embodiment includes a clear low-absorbing and low-iron glass substrate 1 supporting a multilayer thin-film low-E coating 20, and a higher iron containing higher absorbing glass substrate 2. The glass substrates 1 and 2 are laminated together via laminating interlayer or film 3 of or including polyvinyl butyral (PVB), ethylene-vinyl acetate (EVA), or the like. Coating 20 has a low hemispherical emissivity. In certain example embodiments, the hemispherical emissivity of coating 20 is of no greater than 0.40 (more preferably no greater than 0.30, more preferably no greater than 0.25, and most preferably no greater than 0.20). In certain example embodiments, before and/or after heat treatment, coating 20 has a sheet resistance ($R_s$) of no greater than 30 ohms/square (more preferably no greater than 25 ohms/square, and most preferably no greater than 20 ohms/square). This is achieved by providing the coating 20 with a thin transparent conductive oxide layer (TCO) 5 of desired thickness, such as of or including ITO. In the FIG. 1 example, the TCO 5 is indium tin oxide (ITO).

Still referring to FIG. 1, the coating 20 also contains transparent dielectric layers 9a and 9b of or including silicon nitride (e.g., $Si_3N_4$) and/or silicon oxynitride of any suitable stoichiometry. While dielectric layers 9a and 9b are preferably of or including silicon nitride and/or silicon oxynitride, it is possible that one or both of these layers may be of other dielectric materials such as silicon oxide (e.g., $SiO_2$) or titanium oxide (e.g., $TiO_2$). Layer 9b may be both a silicon-inclusive barrier layer and a lower contact layer contacting the ITO 5. Both of layers 9a and 9b are on glass substrate 1 and directly contacting the ITO inclusive layer 5 in certain example embodiments of this invention. Silicon nitride and/or silicon oxynitride layers 9a and 9b may be doped with from about 1-10% Al, more preferably from about 1-8% Al, in certain example embodiments of this invention. Transparent dielectric layers 9a and 9b, when of silicon oxynitride for example, are designed to have a refractive index (n, at 550 nm) of from 1.60 to 1.90, more preferably from 1.65 to 1.80, and most preferably from 1.65 to 1.75. In the FIG. 1 embodiment, the transparent low-E coating 20 may consist or consist essentially of layers 9a, 5 and 9b, where layer 5 is a transparent conductive oxide and layers 9a, 9b are transparent dielectrics. However, in certain example embodiments of this invention, coating 20 may include another transparent dielectric layer(s), not shown, of or including silicon nitride, silicon oxide, silicon oxynitride, or the like, located between clear glass substrate 1 and layer 9b.

Figure 2:
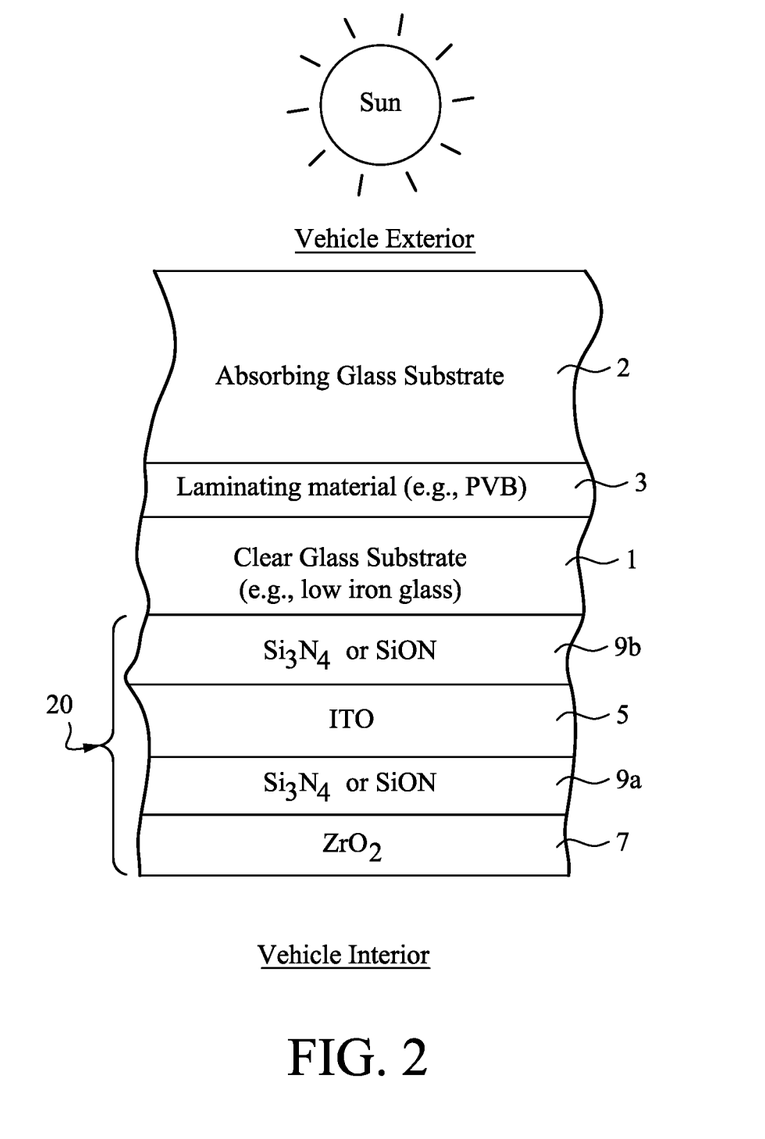
FIG. 2 is a cross sectional view of a laminated window according to another example embodiment of this invention.
Figure 3:
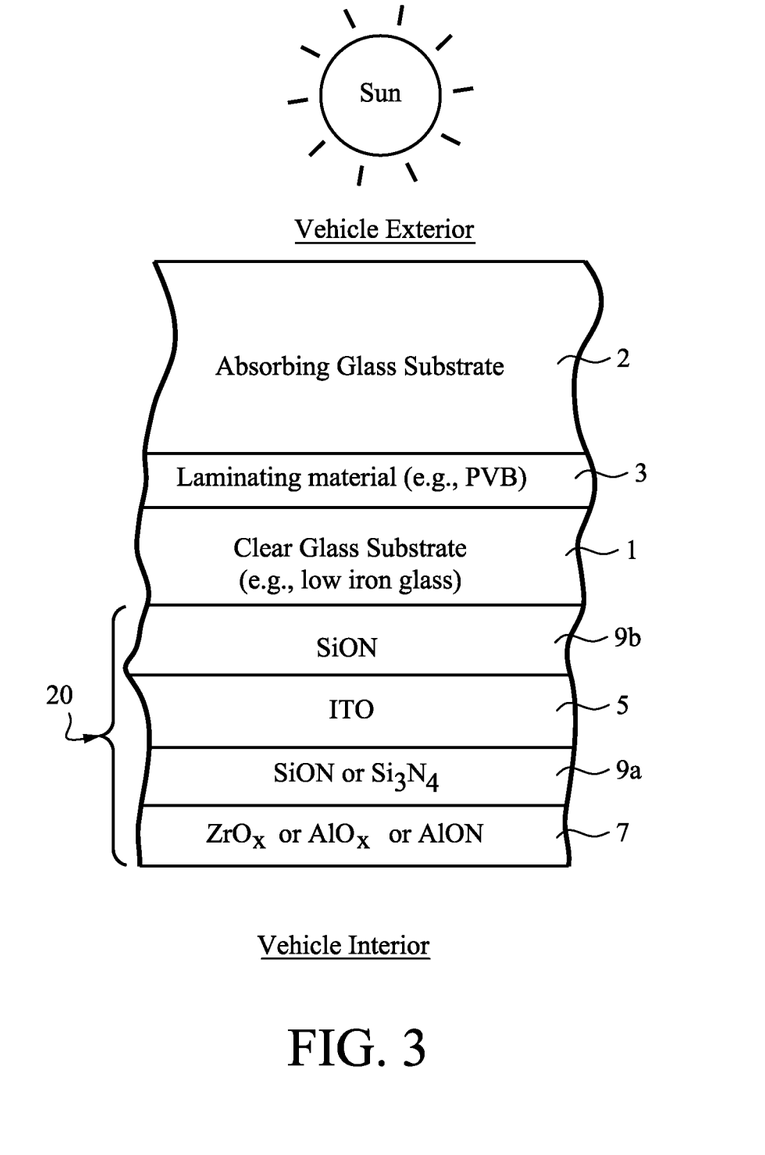
FIG. 3 is a cross sectional view of a laminated window according to another example embodiment of this invention.

FIGS. 2 and 3 are cross sectional views of laminated windows according to other example embodiments of this invention. The FIGS. 2 and 3 embodiments are the same as the FIG. 1 embodiment described above, except that in the FIG. 2-3 embodiments an additional protective overcoat layer 7 is provided in coating 20. The overcoat layer 7 may be of or include zirconium oxide (e.g., $ZrO_2$ or any other suitable stoichiometry), aluminum oxide, niobium oxide, titanium oxide, aluminum nitride, and/or aluminum oxynitride in example embodiments of this invention. The protective overcoat layer 7 is configured to be located adjacent and exposed to the interior of the vehicle or building, as shown in FIGS. 2-3.

Figure 4:
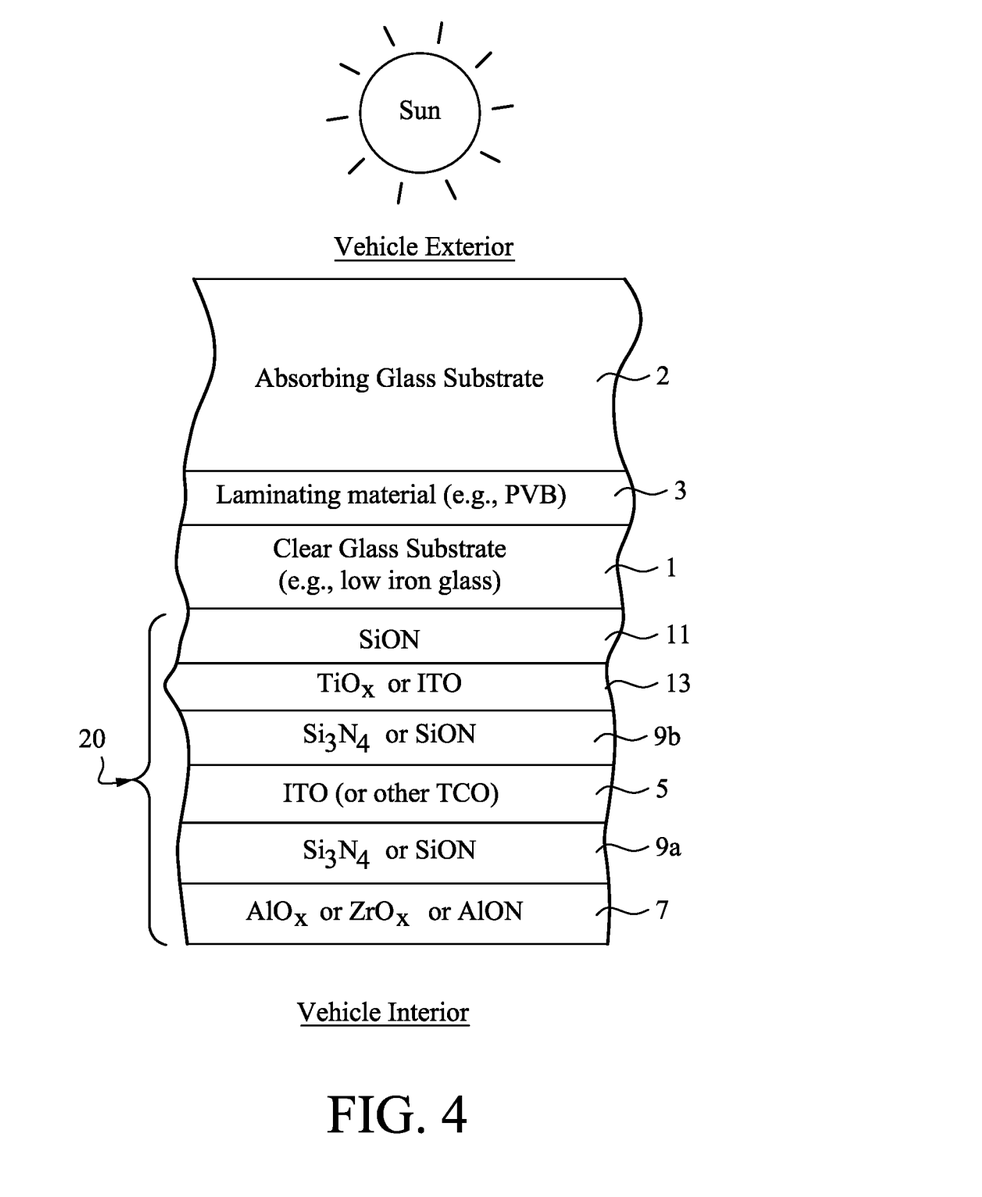
FIG. 4 is a cross sectional view of a laminated window according to another example embodiment of this invention.

FIG. 4 is a cross sectional view of a laminated window according to another example embodiments of this invention. The FIG. 4 embodiment is the same as any of the FIG. 1, FIG. 2, and/or FIG. 3 embodiments described above, except that in the FIG. 4 embodiment an additional transparent dielectric layer 11 and an additional layer 13 are provided in coating 20. Layer 11 may be of or including any of the materials discussed above for layer 9a and/or 9b, such as silicon nitride or silicon oxynitride. Layer 13 may be a transparent conductive oxide such as ITO in certain example embodiments, or alternatively may be a high index transparent dielectric layer of a material such as titanium oxide (e.g., $TiO_2$ or any other suitable stoichiometry), so as to have a refractive index of at least 2.15, more preferably at least 2.20.

The following table provides example physical thicknesses, and example materials, for various layers 9a, 9b, 5 and 7 in the FIG. 1-4 embodiments discussed above. Other materials may have like thicknesses.

|  | Thickness Range (nm) | Preferred Thickness (nm) |
|---|---|---|
| $ZrO_x$ (7) | 1-25 | 2-15 |
| SiNx or SiON (9a) | 10-120 | 40-80 |
| ITO (5) | 40-200 | 75-175 |
| SiNx or SiON (9b) | 10-120 | 40-85 |

In an example of the FIG. 1 embodiment, layer 9b is of silicon oxynitride doped with Al and is about 55 nm thick, ITO layer 5 is about 105 nm thick, and layer 9a is of silicon oxynitride doped with Al and is about 60 nm thick. As indicated above, other TCOs may be used in place of, or in addition to, ITO. For instance, certain example embodiments may incorporate an ITO/Ag/ITO sandwich instead of ITO layer 5.

In addition or in the alternative, in certain example embodiments, a thin hydrophilic and/or photocatalytic coating may be provided over the uppermost layer of coating 20. Such a layer may comprise anatase $TiO_2$, BiO, BiZr, BiSn, SnO, and/or any other suitable material. Such a layer also may help with wettability and/or provide self-cleaning properties to the article.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers therebetween.

The following Examples according to various embodiments of this invention were modeled, with the results as follows.

Example 1

Example 1 was a laminated vehicle window according to the FIG. 1 embodiment, having a 2.5 mm thick clear low iron glass substrate 1 and a 4 mm thick green tinted higher iron glass substrate 2 laminated together with a 0.76 mm thick Saflex™ R clear PVB laminating layer 3. Coating 20 was provided, as shown in FIG. 1, on the surface of the inboard glass substrate 1 so as to face and be exposed to a vehicle interior. Coating 20 in Example 1 was made up of a 55 nm thick silicon oxynitride layer 9b, a 105 nm thick ITO layer 5, and a 60 nm thick silicon oxynitride layer 9a. In Example 1, the clear low iron inboard glass substrate 1 had a base glass composition of about 71.69% $SiO_2$, 13.70% $Na_2O$, 9.35% CaO, 4.07% MgO, 0.41% $Al_2O_3$, 0.23% $K_2O$, and a small amount of salt cake; and a colorant portion of 0.09% total iron (expressed as $Fe_2O_3$), 0.0002% cobalt ($Co_3O_4$ or other suitable stoichiometry), 0.0013% chromium ($Cr_2O_3$ or other suitable stoichiometry), and 0.0007% erbium ($Er_2O_3$ or other suitable stoichiometry), in terms of weight percentage. And in Example 1, the higher iron and higher absorbing green tinted outboard glass substrate 2 had a base glass composition of about 72.01% $SiO_2$, 13.69% $Na_2O$, 8.29% CaO, 3.91% MgO, 0.72% $Al_2O_3$, 0.22% $K_2O$, and a small amount of salt cake; and a colorant portion of 0.87% total iron (expressed as $Fe_2O_3$), 0.0002% cobalt ($Co_3O_4$ or other suitable stoichiometry), and 0.0014% chromium ($Cr_2O_3$ or other suitable stoichiometry), in terms of weight percentage. The window of Example 1, after heat treatment, had a visible transmission of 70%, an exterior visible reflectance of 8%, an interior visible reflectance of 8%, and an SHGC value of 0.47 (47%).

Example 2

Example 2 differed from Example 1, in that in Example 2 both glass substrates 1 and 2 were low iron clear glass substrates, and no coating 20 was provided. Thus, Example 2 was a laminated vehicle window according to the FIG. 1 embodiment, having a pair of 3 mm thick clear low iron glass substrates 1 and 2 that were laminated to each other with a 0.76 mm thick Saflex™ R clear PVB laminating layer 3. In Example 2, both glass substrates 1 and 2 had a base glass composition of about 71.69% $SiO_2$, 13.70% $Na_2O$, 9.35% CaO, 4.07% MgO, 0.41% $Al_2O_3$, 0.23% $K_2O$, and a small amount of salt cake; and a colorant portion of 0.09% total iron (expressed as $Fe_2O_3$), 0.0002% cobalt ($Co_3O_4$ or other suitable stoichiometry), 0.0013% chromium ($Cr_2O_3$ or other suitable stoichiometry), and 0.0007% erbium ($Er_2O_3$ or other suitable stoichiometry), in terms of weight percentage. The window of Example 2, after heat treatment, had a visible transmission of 89%, an exterior visible reflectance of 8%, an interior visible reflectance of 8%, and an SHGC value of 0.80 (80%).

Example 3

Example 3 differed from Example 1, in that in Example 3 both glass substrates 1 and 2 were relatively high iron green tinted glass substrates. Thus, Example 3 was a laminated vehicle window according to the FIG. 1 embodiment, having a pair of 3 mm thick green tinted relatively high iron glass substrates 1 and 2 laminated together with a 0.76 mm thick Saflex™ R clear PVB laminating layer 3. Coating 20 was provided, as shown in FIG. 1, on the surface of the inboard glass substrate 1 so as to face and be exposed to a vehicle interior. Coating 20 in Example 3 was the same as in Example 1. In Example 3, both glass substrates 1 and 2 were green tinted and each had a base glass composition of about 71.4% $SiO_2$, 13.95% $Na_2O$, 8.57% CaO, 4.05% MgO, 0.72% $Al_2O_3$, 0.21% $K_2O$, and a small amount of salt cake; and a colorant portion of 0.78% total iron (expressed as $Fe_2O_3$), 0.0002% cobalt ($Co_3O_4$ or other suitable stoichiometry), 0.0012% chromium ($Cr_2O_3$ or other suitable stoichiometry), and 0.0001% erbium ($Er_2O_3$ or other suitable stoichiometry), in terms of weight percentage. The window of Example 3, after heat treatment, had a visible transmission of 67%, an exterior visible reflectance of 7%, an interior visible reflectance of 8%, and an SHGC value of 0.44 (44%).

Example 4

Example 4 differed from Example 1, in that in Example 4 both glass substrates 1 and 2 were low iron clear glass substrates. Thus, Example 4 was a laminated vehicle window according to the FIG. 1 embodiment, having a pair of 3 mm thick clear low iron glass substrates 1 and 2 that were laminated to each other with a 0.76 mm thick Saflex™ R clear PVB laminating layer 3. Coating 20 in Example 4 was the same as in Example 1, and was in the same position as shown in FIG. 1. In Example 4, both glass substrates 1 and 2 had a base glass composition of about 71.69% $SiO_2$, 13.70% $Na_2O$, 9.35% CaO, 4.07% MgO, 0.41% $Al_2O_3$, 0.23% $K_2O$, and a small amount of salt cake; and a colorant portion of 0.09% total iron (expressed as $Fe_2O_3$), 0.0002% cobalt ($Co_3O_4$ or other suitable stoichiometry), 0.0013% chromium ($Cr_2O_3$ or other suitable stoichiometry), and 0.0007% erbium ($Er_2O_3$ or other suitable stoichiometry), in terms of weight percentage. The window of Example 4, after heat treatment, had a visible transmission of 86%, an exterior visible reflectance of 9%, an interior visible reflectance of 9%, and an SHGC value of 0.73 (73%).

Example 5

Example 5 was the same as Example 1, except that the glass substrates 1 and 2 were flipped around compared to Example 1. In other words, the positions of the clear and green glass substrates from Example 1 were switched in Example 5, so that in Example 5 the clear glass was closer to the vehicle exterior and the green glass was closer to the vehicle interior. The coating 20 remained on the inboard glass substrate in Example 5, in the position shown in FIG. 1 exposed to the vehicle interior, and thus on the green glass substrate. The window of Example 5, after heat treatment, had a visible transmission of 70%, an exterior visible reflectance of 8%, an interior visible reflectance of 8%, and an SHGC value of 0.48 (48%). Thus, surprisingly and unexpectedly, switching the positions of the clear and tinted glass substrates in Example 1 and 5 resulted in about a 1% lower SHGC value when the clear glass substrate was closer to the vehicle interior in Example 1 (compare to Example 5).

Comparing Example 1 with Examples 2-5 above, it can be seen that the use of a low iron glass for the inboard substrate 1 and a higher iron glass for the outboard substrate 2, coupled with the ITO based low-E coating 20 on the surface exposed to the vehicle interior (Example 1), surprisingly resulted in a combination of acceptably high visible transmission and a low SHGC value. In particular, the SHGC value of Example 1 was lower than in Examples 2 and 4-5. Unexpectedly, switching the positions of the clear and tinted glass substrates in Example 1 and 5 resulted in about a 1% lower SHGC value when the clear glass substrate was closer to the vehicle interior in Example 1 (compared to Example 5). The only difference between Examples 1 and 5 was switching the positions of the two glass substrates. Moreover, while the SHGC value of Example 3 was acceptably low, the visible transmission of Example 3 suffered and was below 70%. Thus, only Example 1 was able to achieve a combination of high visible transmission and low SHGC.

Example 6

Example 6 was a laminated vehicle window according to the FIG. 1 embodiment, having a 2 mm thick clear low iron glass substrate 1 and a 5 mm thick dark tinted higher iron glass substrate 2 laminated together with a 0.76 mm thick Saflex™ R clear PVB laminating layer 3. Coating 20 was provided, as shown in FIG. 1, on the surface of the inboard glass substrate 1 so as to face and be exposed to a vehicle interior. Coating 20 in Example 6 was the same as in Example 1 and was made up of a 55 nm thick silicon oxynitride layer 9b, a 105 nm thick ITO layer 5, and a 60 nm thick silicon oxynitride layer 9a. In Example 6, the clear low iron inboard glass substrate 1 had a base glass composition of about 71.69% $SiO_2$, 13.70% $Na_2O$, 9.35% CaO, 4.07% MgO, 0.41% $Al_2O_3$, 0.23% $K_2O$, and a small amount of salt cake; and a colorant portion of 0.09% total iron (expressed as $Fe_2O_3$), 0.0002% cobalt ($Co_3O_4$ or other suitable stoichiometry), 0.0013% chromium ($Cr_2O_3$ or other suitable stoichiometry), and 0.0007% erbium ($Er_2O_3$ or other suitable stoichiometry), in terms of weight percentage. And in Example 6, the higher iron and higher absorbing dark tinted outboard glass substrate 2 had a base glass composition of about 71.78% $SiO_2$, 13.72% $Na_2O$, 7.86% CaO, 3.95% MgO, 0.58% $Al_2O_3$, 0.19% $K_2O$, and a small amount of salt cake; and a colorant portion of 1.60% total iron (expressed as $Fe_2O_3$), 0.02% cobalt ($Co_3O_4$ or other suitable stoichiometry), 0.01% chromium ($Cr_2O_3$ or other suitable stoichiometry), and 0.003% Se, in terms of weight percentage. The window of Example 6, after heat treatment, had a visible transmission of 13%, an exterior visible reflectance of 5%, an interior visible reflectance of 5%, and an SHGC value of 0.26 (26%).

Example 7

For purposes of comparing with Example 6, Example 7 differed from Example 6 in that the substrates were reversed. In other words, in Example 7 the clear low iron glass substrate was on the outboard side and the higher iron dark tinted glass substrate was on the inboard side. Thus, Example 7 was a laminated vehicle window having a 2 mm thick clear low iron glass substrate 2 and a 5 mm thick dark tinted higher iron glass substrate 1 laminated together with a 0.76 mm thick Saflex™ R clear PVB laminating layer 3. Coating 20 was provided, as shown in FIG. 1, on the surface of the inboard glass substrate so as to face and be exposed to a vehicle interior. Coating 20 in Example 7 was the same as in Examples 1 and 6. In Example 7, the clear low iron outboard glass substrate 2 had a base glass composition of about 71.69% $SiO_2$, 13.70% $Na_2O$, 9.35% CaO, 4.07% MgO, 0.41% $Al_2O_3$, 0.23% $K_2O$, and a small amount of salt cake; and a colorant portion of 0.09% total iron (expressed as $Fe_2O_3$), 0.0002% cobalt ($Co_3O_4$ or other suitable stoichiometry), 0.0013% chromium ($Cr_2O_3$ or other suitable stoichiometry), and 0.0007% erbium ($Er_2O_3$ or other suitable stoichiometry), in terms of weight percentage. And in Example 7, the higher iron and higher absorbing dark tinted inboard glass substrate 1 had a base glass composition of about 71.78% $SiO_2$, 13.72% $Na_2O$, 7.86% CaO, 3.95% MgO, 0.58% $Al_2O_3$, 0.19% $K_2O$, and a small amount of salt cake; and a colorant portion of 1.60% total iron (expressed as $Fe_2O_3$), 0.02% cobalt ($Co_3O_4$ or other suitable stoichiometry), 0.01% chromium ($Cr_2O_3$ or other suitable stoichiometry), and 0.003% Se, in terms of weight percentage. The window of Example 7, after heat treatment, had a visible transmission of 13%, an exterior visible reflectance of 5%, an interior visible reflectance of 5%, and an SHGC value of 0.28 (28%).

Comparing Examples 6 and 7, it can be seen that the SHGC value surprisingly and unexpectedly was lower in Example 6 compared to Example 7, where the only difference was the positions of the respective substrates. In Example 6, the clear glass substrate was on the inboard side and the dark absorbing higher iron glass substrate was on the outboard side. Whereas in Example 7, the clear glass substrate was on the outboard side and the dark absorbing higher iron glass substrate was on the inboard side. Thus, it can be seen that the use of a low iron glass for the inboard substrate 1 and a higher iron glass for the outboard substrate 2, coupled with the ITO based low-E coating 20 on the surface exposed to the vehicle interior (Example 6), surprisingly resulted in a combination of desirable visible transmission and a surprisingly lower SHGC value (0.26 in Example 6, compared to 0.28 in Example 7).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, while the two glass substrates are preferably different in preferred embodiments of this invention (e.g., see Examples 1 and 5 above), it is possible that in alternative embodiments of this invention the glass substrates 1 and 2 may be the same or essentially the same, and/or that both glass substrates may be either clear or tinted in certain alternative embodiments of this invention (e.g., see other Examples above).

In an example embodiment of this invention, there is provided a vehicle (e.g., car, truck, train, bus, or boat) window comprising: first and second glass substrates laminated to each other via a polymer inclusive interlayer, wherein the first glass substrate is configured to be located closer to a vehicle interior than is the second glass substrate; a multi-layer coating on the first glass substrate and configured to be located adjacent and exposed to a vehicle interior, so that the coating is not located between the first and second glass substrates, wherein the coating has a sheet resistance ($R_s$) of no greater than 32 ohms/square and comprises a transparent conductive layer comprising indium-tin-oxide (ITO) located between and directly contacting first and second transparent dielectric layers, and wherein the first transparent dielectric layer is located between at least the first glass substrate and the transparent conductive layer comprising ITO; wherein a base glass composition of each of the first and second glass substrates comprises (wt. %) $SiO_2$ 67-75%, $Na_2O$ 10-20%, CaO 5-15%, MgO 0-5%, $Al_2O_3$ 0-5%, $K_2O$ 0-5%; wherein the second glass substrate contains at least 0.25% more total iron (expressed as $Fe_2O_3$) than does the first glass substrate.

In the vehicle window of the immediately preceding paragraph, the second glass substrate may contain at least 0.40% more total iron than does the first glass substrate.

In the vehicle window of any of the preceding two paragraphs, the second glass substrate may contain at least 0.50% (more preferably at least 0.60%) more total iron than does the first glass substrate.

In the vehicle window of any of the preceding three paragraphs, the first glass substrate may have a visible transmission at least 10% (more preferably at least 15%, and most preferably at least 20%) higher (Ill. A, 2 degree Observer) than a visible transmission of the second glass substrate, at a reference thickness of 6 mm.

In the vehicle window of any of the preceding four paragraphs, in certain examples there is no low-E coating provided between the first and second glass substrates.

In the vehicle window of any of the preceding five paragraphs, the first and second dielectric layers may be silicon based and comprise at least one of oxygen and nitrogen.

In the vehicle window of any of the preceding six paragraphs, the first and second dielectric layers may each comprise silicon nitride and/or silicon oxynitride.

In the vehicle window of any of the preceding seven paragraphs, the coating may further comprise an overcoat comprising metal oxide such as zirconium oxide, aluminum oxide, aluminum oxynitride, or the like. The overcoat is of or includes an oxide of zirconium in preferred embodiments.

In the vehicle window of any of the preceding eight paragraphs, the coating may further comprise another dielectric layer (e.g., silicon nitride, silicon oxide, and/or silicon oxynitride) located between at least the first glass substrate and the first dielectric layer.

In the vehicle window of any of the preceding nine paragraphs, the layer comprising ITO may have a refractive index (n) of from 1.80-1.93.

In the vehicle window of any of the preceding ten paragraphs, the coating may comprise, moving away from the first glass substrate: the first dielectric layer, the first dielectric layer may comprise silicon oxynitride and may have an index of refraction of 1.60-1.90 and a thickness of from 10-120 nm; the layer comprising ITO, the layer comprising ITO may have a thickness of from 40-200 nm; and the second dielectric layer, the second dielectric layer may comprise silicon oxynitride and may have an index of refraction of 1.60-1.90 and/or a thickness of from 10-120 nm.

In the vehicle window of any of the preceding eleven paragraphs, the coating may comprise, moving away from the first glass substrate: the first dielectric layer, the first dielectric layer may comprise silicon oxynitride and may have an index of refraction of 1.65-1.80 and/or a thickness of from 40-85 nm, the layer comprising ITO which may have a thickness of from 75-175 nm, and the second dielectric layer which may comprise silicon oxynitride and may have an index of refraction of 1.65-1.80 and/or a thickness of from 40-80 nm.

In the vehicle window of any of the preceding twelve paragraphs, a colorant portion of the first glass substrate may comprise from 0.001-0.20% total iron (expressed as $Fe_2O_3$), and a colorant portion of the second glass substrate may comprise at least 0.30% total iron (expressed as $Fe_2O_3$).

In the vehicle window of any of the preceding thirteen paragraphs, a colorant portion of the first glass substrate may comprise from 0.001-0.20% total iron (expressed as $Fe_2O_3$), and a colorant portion of the second glass substrate may comprise at least 0.50% total iron (expressed as $Fe_2O_3$).

In the vehicle window of any of the preceding fourteen paragraphs, a colorant portion of the first glass substrate may comprise from 0.001-0.15% total iron (expressed as $Fe_2O_3$), and a colorant portion of the second glass substrate may comprise at least 0.60% total iron (expressed as $Fe_2O_3$).

In the vehicle window of any of the preceding fifteen paragraphs, a colorant portion of the first glass substrate may comprise from 0.01-0.10% total iron (expressed as $Fe_2O_3$), and a colorant portion of the second glass substrate may comprise at least 0.70% total iron (expressed as $Fe_2O_3$).

In the vehicle window of any of the preceding sixteen paragraphs, the first glass substrate may be a clear glass substrate, and the second glass substrate may be a tinted (e.g., green tinted, and/or dark/black/grey tinted) glass substrate.

In the vehicle window of any of the preceding seventeen paragraphs, the polymer inclusive interlayer may comprise PVB.

In the vehicle window of any of the preceding eighteen paragraphs, the coating may have a sheet resistance ($R_s$) of no greater than 25 ohms/square, and/or a hemispherical emissivity of no greater than 0.30.

In the vehicle window of any of the preceding nineteen paragraphs, the coating may have a sheet resistance ($R_s$) of no greater than 20 ohms/square, and/or a hemispherical emissivity of no greater than 0.20.

In the vehicle window of any of the preceding twenty paragraphs, the window may have an SHGC value of no greater than 0.48.

In the vehicle window of any of the preceding twenty one paragraphs, the window may have a visible transmission of at least 70% (Ill. A, 2 degree Observer), and/or an SHGC value of no greater than 0.48.

In the vehicle window of any of the preceding twenty two paragraphs, at least the coating and the first glass substrate may be heat treated. The second glass substrate may also be heat treated, during thermal tempering and/or during heat bending/lamination of the two glass substrates.

What is claimed is:

1. A vehicle window comprising:
    first and second glass substrates laminated to each other via a polymer inclusive interlayer, wherein the first glass substrate is configured to be located closer to a vehicle interior than is the second glass substrate;
    a multi-layer coating on the first glass substrate and configured to be located adjacent and exposed to a vehicle interior, so that the coating is not located between the first and second glass substrates,
    wherein the coating has a sheet resistance ($R_s$) of no greater than 32 ohms/square and comprises a transparent conductive layer comprising indium-tin-oxide (ITO) located between and directly contacting first and second transparent dielectric layers, and wherein the first transparent dielectric layer is located between at least the first glass substrate and the transparent conductive layer comprising ITO;
    wherein a base glass composition of each of the first and second glass substrates comprises:

| Ingredient | Wt. % |
|---|---|
| $SiO_2$ | 67-75% |
| $Na_2O$ | 10-20% |
| CaO | 5-15% |
| MgO | 0-5% |
| $Al_2O_3$ | 0-5% |
| $K_2O$ | 0-5%; | wherein the second glass substrate contains at least 0.40% more total iron (expressed as $Fe_2O_3$) than does the first glass substrate, so that the first glass substrate having less total iron is the inboard glass substrate and is less absorbing than is the second glass substrate which is the outboard glass substrate, so as to lower an SHGC value of the vehicle window; and
    wherein the coating is formed to lower total solar transmission (Tts) of the window by at least 5% absolute compared to if no coating was provided while also ensuring that the window has a visible transmission of at least 70% (Ill. A, 2 degree Observer).

2. The vehicle window of claim 1, wherein the second glass substrate contains at least 0.50% more total iron than does the first glass substrate.

3. The vehicle window of claim 1, wherein the second glass substrate contains at least 0.60% more total iron than does the first glass substrate.

4. The vehicle window of claim 1, wherein the first glass substrate has a visible transmission at least 10% higher (Ill. A, 2 degree Observer) than a visible transmission of the second glass substrate, at a reference thickness of 6 mm.

5. The vehicle window of claim 1, wherein the first glass substrate has a visible transmission at least 15% higher (Ill. A, 2 degree Observer) than a visible transmission of the second glass substrate, at a reference thickness of 6 mm.

6. The vehicle window of claim 1, wherein the first glass substrate has a visible transmission at least 20% higher (Ill. A, 2 degree Observer) than a visible transmission of the second glass substrate, at a reference thickness of 6 mm.

7. The vehicle window of claim 1, wherein no low-E coating is provided between the first and second glass substrates.

8. The vehicle window of claim 1, wherein the first and second dielectric layers are silicon based and comprise at least one of oxygen and nitrogen.

9. The vehicle window of claim 1, wherein the first and second dielectric layers each comprise silicon nitride.

10. The vehicle window of claim 1, wherein the first and second dielectric layers each comprise silicon oxynitride.

11. The vehicle window of claim 1, wherein the coating further comprises an overcoat comprising metal oxide.

12. The vehicle window of claim 11, wherein the overcoat comprises an oxide of zirconium.

13. The vehicle window of claim 1, wherein the coating further comprises another dielectric layer located between at least the first glass substrate and the first dielectric layer.

14. The vehicle window of claim 1, wherein the layer comprising ITO has a refractive index (n) of from 1.80-1.93.

15. The vehicle window of claim 1, wherein the coating comprises, moving away from the first glass substrate:
the first dielectric layer, the first dielectric layer comprising silicon oxynitride, having an index of refraction of 1.60-1.90, and having a thickness of from 10-120 nm,
the layer comprising ITO, the layer comprising ITO having a thickness of from 40-200 nm, and
the second dielectric layer, the second dielectric layer comprising silicon oxynitride, having an index of refraction of 1.60-1.90, and having a thickness of from 10-120 nm.

16. The vehicle window of claim 1, wherein the coating comprises, moving away from the first glass substrate:
the first dielectric layer, the first dielectric layer comprising silicon oxynitride, having an index of refraction of 1.65-1.80, and having a thickness of from 40-85 nm,
the layer comprising ITO, the layer comprising ITO having a thickness of from 75-175 nm, and
the second dielectric layer, the second dielectric layer comprising silicon oxynitride, having an index of refraction of 1.65-1.80, and having a thickness of from 40-80 nm.

17. The vehicle window of claim 1, wherein a colorant portion of the first glass substrate comprises from 0.001-0.20% total iron (expressed as $Fe_2O_3$), and a colorant portion of the second glass substrate comprises at least 0.30% total iron (expressed as $Fe_2O_3$).

18. The vehicle window of claim 1, wherein a colorant portion of the first glass substrate comprises from 0.001-0.20% total iron (expressed as $Fe_2O_3$), and a colorant portion of the second glass substrate comprises at least 0.50% total iron (expressed as $Fe_2O_3$).

19. The vehicle window of claim 1, wherein a colorant portion of the first glass substrate comprises from 0.001-0.15% total iron (expressed as $Fe_2O_3$), and a colorant portion of the second glass substrate comprises at least 0.60% total iron (expressed as $Fe_2O_3$).

20. The vehicle window of claim 1, wherein a colorant portion of the first glass substrate comprises from 0.01-0.10% total iron (expressed as $Fe_2O_3$), and a colorant portion of the second glass substrate comprises at least 0.70% total iron (expressed as $Fe_2O_3$).

21. The vehicle window of claim 1, wherein a colorant portion of the first glass substrate comprises:

| Ingredient | (wt. %) |
|---|---|
| total iron (expressed as $Fe_2O_3$): | 0.001-0.20% |
| erbium oxide: | 0-0.10% |
| selenium (Se): | 0-0.10% |
| cobalt oxide: | 0-0.10% |
| cerium oxide: | 0-0.30%, | and a colorant portion of the second glass substrate comprises:

| Ingredient | (wt. %) |
|---|---|
| total iron (expressed as $Fe_2O_3$): | ≥0.50% |
| erbium oxide: | 0-0.10% |
| selenium (Se): | 0-0.10% |
| cobalt oxide: | 0-0.10% |
| cerium oxide: | 0-0.30%. |

22. The vehicle window of claim 1, wherein a colorant portion of the first glass substrate comprises:

| Ingredient | (wt. %) |
|---|---|
| total iron (expressed as $Fe_2O_3$): | 0.005-0.12% |
| erbium oxide: | 0-0.10% |
| selenium (Se): | 0-0.10% |
| cobalt oxide: | 0.00001-0.10% |
| cerium oxide: | 0-0.30%, | and a colorant portion of the second glass substrate comprises:

| Ingredient | (wt. %) |
|---|---|
| total iron (expressed as $Fe_2O_3$): | ≥0.60% |
| erbium oxide: | 0-0.10% |
| selenium (Se): | 0-0.10% |
| cobalt oxide: | 0.00001-0.05% |
| cerium oxide: | 0-0.30%. |

23. The vehicle window of claim 1, wherein the first glass substrate is a clear glass substrate, and the second glass substrate is a tinted glass substrate.

24. The vehicle window of claim 1, wherein the polymer inclusive interlayer comprises PVB.

25. The vehicle window of claim 1, wherein the coating has a sheet resistance ($R_s$) of no greater than 25 ohms/square, and a hemispherical emissivity of no greater than 0.30.

26. The vehicle window of claim 1, wherein the coating has a sheet resistance ($R_s$) of no greater than 20 ohms/square, and/or a hemispherical emissivity of no greater than 0.20.

27. The vehicle window of claim 1, wherein the window has an SHGC value of no greater than 0.48.

28. The vehicle window of claim 1, wherein at least the coating and the first glass substrate are heat treated.

29. A window comprising:
first and second glass substrates laminated to each other via a polymer inclusive interlayer, wherein the first glass substrate is configured to be located closer to a vehicle interior or building interior than is the second glass substrate, the first glass substrate having at least 0.40% less total iron than the second glass substrate, and wherein the first glass substrate is an inboard glass substrate and is less absorbing than is the second glass substrate;

a multi-layer coating on the first glass substrate and configured to be located adjacent and exposed to a vehicle interior or building interior, so that the coating is not located between the first and second glass substrates, wherein the coating comprises a transparent conductive layer comprising indium-tin-oxide (ITO) located between and directly contacting first and second transparent dielectric layers, and wherein the first transparent dielectric layer is located between at least the first glass substrate and the transparent conductive layer comprising ITO;

wherein a base glass composition of each of the first and second glass substrates comprises:

| Ingredient | Wt. % |
| --- | --- |
| $SiO_2$ | 67-75% |
| $Na_2O$ | 10-20% |
| CaO | 5-15% |
| MgO | 0-5% |
| $Al_2O_3$ | 0-5% |
| $K_2O$ | 0-5%; | wherein no low-E coating is provided between the first and second glass substrates;

wherein the first and second dielectric layers are silicon based and comprise at least one of oxygen and nitrogen;

wherein the coating comprises, moving away from the first glass substrate:

the first dielectric layer, the first dielectric layer having an index of refraction of 1.60-1.90 and a thickness of from 10-120 nm, the layer comprising ITO, the layer comprising ITO having a thickness of from 75-175 nm, and the second dielectric layer, the second dielectric layer having an index of refraction of 1.60-1.90 and a thickness of from 10-120 nm;

wherein the coating has a sheet resistance ($R_s$) of no greater than 25 ohms/square and a hemispherical emissivity of no greater than 0.30; and wherein the window has an SHGC value of no greater than 0.48.

30. The window of claim 29, wherein the first and second dielectric layers each comprise silicon oxynitride.

31. The window of claim 29, wherein the coating further comprises an overcoat comprising an oxide of zirconium.

32. The window of claim 29, wherein the coating has a sheet resistance ($R_s$) of no greater than 20 ohms/square, and/or a hemispherical emissivity of no greater than 0.20.

33. The window of claim 29, wherein the window has a visible transmission of at least 70% (Ill. A, 2 degree Observer).

* * * * *